Nov. 22, 1966    J. C. WRENCH ETAL    3,286,481
HEATING ARRANGEMENT FOR AIR CONDITIONING CONTROLS
Filed Dec. 23, 1964
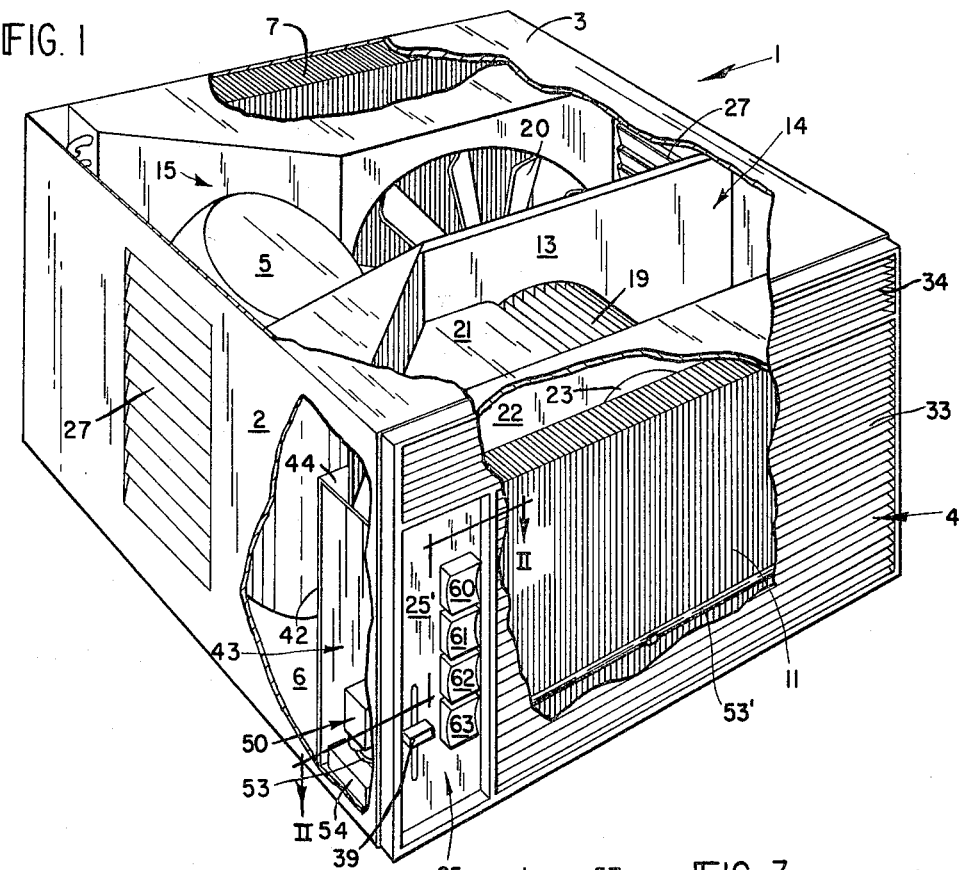
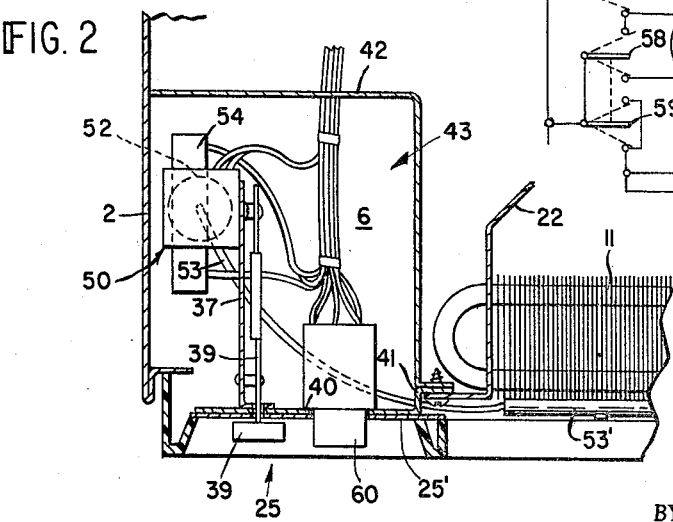
INVENTORS.
JAMES C. WRENCH.
WILLIAM W. BELL, JR.
BY
*Frederick E. McMullen*
ATTORNEY.

United States Patent Office 3,286,481
Patented Nov. 22, 1966

3,286,481
HEATING ARRANGEMENT FOR AIR
CONDITIONING CONTROLS
James C. Wrench, Cazenovia, and William W. Bell, Jr.,
Marcellus, N.Y., assignors to Carrier Corporation,
Syracuse, N.Y., a corporation of Delaware
Filed Dec. 23, 1964, Ser. No. 420,685
3 Claims. (Cl. 62—202)

This invention relates to air conditioning apparatus, and more particularly to an arrangement for warming the control box of a room type air conditioning unit.

Room type air conditioning units may be positioned within the opening of a window with the front face of the unit substantially flush with the window opening to reduce the intrusion of the unit into the room area. However, when flush mounted, a substantial portion of the unit protrudes outdoors. Where control of the air conditioning unit is by means of a fluid-filled temperature responsive mechanism, the temperature sensing capillary thereof is arranged so that it is exposed to room temperature conditions. However, the remainder of the temperature responsive controlling mechanism including a portion of the capillary is disposed within the unit, for example in a control box located out of sight within the confines of the unit housing. With a portion of the unit housing outdoors, which in the case of a flush mounted unit may be substantial, temperatures prevailing in the control box are often less than room temperatures. Where the temperature responsive controlling mechanism is of the type which controls from the lowest temperature to which any part thereof is subject, a low temperature in the control box area may prevent response of the temperature responsive controlling mechanism to a room cooling demand and hence prevent operation of the air conditioning unit when desired.

It is a principal object of the present invention to provide a new and improved contral mechanism for air conditioning units of the room type.

It is a further object of the present invention to provide an arrangement for artificially maintaining temperatures in the control box of a room air conditioner slightly above indoor temperatures.

It is an object of the present invention to provide an air conditioning unit incorporating a small heater circumjacent the power operator of a closed fluid-filled temperature sensing device to obviate the effect of outdoor temperatures on the temperature sensing device.

This invention relates to an apparatus for air conditioning a space, the combination which comprises a cover with compression means, an evaporator and a condenser connected in a closed refrigerant flow circuit therewithin; fan means for circulating air to be conditioned over the evaporator; control means for the apparatus including switch means adapted when actuated to energize the apparatus to condition the space and a temperature responsive operator for the switch means, the temperature responsive operator comprising an expansible chamber actuator and a temperature responsive element connected thereto, the temperature responsive element protruding into the space being conditioned, the actuator and temperature responsive element forming a closed fluid-filled system effective when exposed to a predetermined temperture to actuate the switch means; and heating means for heating the portion of the thermal responsive operator exposed to outdoor temperatures to permit the temperature responsive element to control operation of the apparatus when outdoor temperatures are below the predetermined response temperature.

Other objects will be apparent from the ensuing description and drawings in which:

FIGURE 1 is a perspective view with parts in section illustrating an air conditioning unit of the room type incorporating applicants' unique control box heater;

FIGURE 2 is a sectional view taken along lines II—II of FIGURE 1 showing the details of the air conditioning unit control box; and FIGURE 3 is a circuit diagram for the air conditioning unit shown in FIGURE 1.

Referring to FIGURE 1 of the drawings, an air conditioning unit 1 embodying the present invention is therein shown. Unit 1 includes a casing or housing 3 encompassing a refrigeration system which includes compressor 5, condenser 7, and evaporator 11 interconnected by suitable conduit means (not shown) to form a closed path for refrigerant flow.

Housing 3 is partitioned into evaporator compartment 14 and condenser compartment 15 by a pair of spaced vertically disposed panel members 13, 22 interconnected by evaporator fan scroll member 21. Evaporator fan 19 is disposed in the space between panel members 13, 22, opening 23 in panel member 22 communicating with the inlet side of fan 19. Fan 19 and condenser fan 20 are preferably driven by two-speed fan motor 17.

The air conditioning unit 1 may be placed in a window or through the wall of an enclosure so that inlet 33 and outlet 34 in the front face 4 thereof communicate with the area to be conditioned while the opposite end or rear face thereof communicates with the outdoors. Present day practice normally positions unit 1 in the window or wall opening so that the front face thereof is substantially flush with the inside wall of the area being conditioned. However, other positions of the unit may be contemplated. The unit operating controls, designated generally by the numeral 25, are preferably positioned on the front face of unit 1 to permit flush mounting of unit 1.

During operation of the unit 1, evaporator fan 19 draws air to be conditioned through inlet 33 into heat exchange relation with evaporator 11 into opening 23 in panel 22, air discharging from fan 19 through outlet 34 in the front face of unit 1 into the area being conditioned. Condenser fan 20 draws outdoor air through openings 27 in the sides of housing 3, the air being discharged through condenser 7 outdoors.

Referring to FIGURES 1 and 2 of the drawings, a vertically disposed member 40 is suitably fastened within outdoor compartment 15 adjacent the front face 4 of unit 1. Panel 25' of control means 25 abuts member 40. A second member 42 is fastened to leg 41 of member 40 between side 2 of housing 3 and partition panel member 22. Members 40, 42 cooperate with the side 2 and base 6 of housing 3 to define a space or enclosure 43 for the operating components of control means 25. A top member 44 completes enclosure 43. Plate 37 fastened to member 40 in enclosure 43 serves to support a temperature responsive control mechanism 50 having manual adjusting arm 39 suitably attached thereto.

As may be seen by reference to FIGURE 3 of the drawings, control mechanism 50 includes switch 51 and a closed fluid-filled temperature responsive actuator therefor comprising diaphragm 52 and capillary element 53. Temperature responsive control mechanism 50 is of the type which responds to the lowest temperature to which any portion thereof, that is either capillary 53 or diaphragm 52 is exposed. For example, where temperature responsive control mechanism 50 is adjusted to respond to a temperature of 25° C., substantially all of diaphragm 52 and capillary 53 thereof must be at or above the exemplary 25° C. temperature setting before switch 51 is actuated.

Capillary 53 of temperature responsive control mechanism 50, which is preferably encased in sheath 53', is disposed across the face of evaporator 11 closely adjacent thereto near the base thereof. By this arrangement, temperature responsive control mechanism 50 responds primarily to temperature conditions of the air circumjacent evaporator 11. In addition, the proximity of capillary 53 to evaporator 11 results in temperature responsive control mechanism 50 responding, to a lesser degree, to temperature conditions of evaporator 11.

Where the air conditioning unit 1 is defrosted to melt frost accumulated on evaporator 11, water therefrom passes downwardly along the face of evaporator 11 into contact with capillary 53. By disposing capillary 53 across the length of evaporator 11 and by the use of a control mechanism of the type which responds to the lowest temperature to which any portion thereof is subjected, control mechanism 50, through contact of the chilled frost water with capillary 53, prevents operation of the unit 1 until the entire surface of evaporator 11 is substantially free from frost.

A resistance type heating element 54 is disposed circumjacent diaphragm 52 of temperature responsive control mechanism 50 within the enclosure 43. Pushbutton type operators 60, 61, 62, 63 control operation of the unit compressor and fan motor as will be more fully explained hereinafter.

Referring specifically to FIGURE 3 of the drawings, the high speed winding 17' of fan motor 17 is connected in series with each of switches 57, 58 across lines $L_1$ and $L_2$. The low speed winding 17'' of fan motor 17 is connected in series with switch 58 across lines $L_1$, $L_2$. Drive motor 8 of compressor 5 is connected in series with switch 51 of control mechanism 50 and switch 59 across lines $L_1$, $L_2$. Resistor 54 is connected in series with switch 59. Switches 58, 59 are interconnected for joint operation.

Manual depression of pushbutton 60 moves switch 57, operably connected thereto, to complete a circuit through the high speed winding 17' of fan motor 17 whereby condenser and evaporator fans 19, 20 are driven at high speed.

Manual depression of pushbutton 61 moves interconnected switches 58, 59 in an upward direction. Switch 58 completes a circuit through the high speed winding 17' of fan motor 17. Switch 59 completes a circuit from line $L_1$ through switch 51 to line $L_2$ to ready compressor drive motor 8 for energization. Switch 59 similarly completes a circuit to energize resistor 54. Closure of switch 51 of control mechanism 50 in response to a demand for cooling energizes compressor motor 8 to operate the unit 1.

Manual depression of pushbutton 62 moves interconnected switches 58, 59 in a downward direction. Switch 58 completes a circuit through the low speed winding 17'' of fan motor 17 to drive condenser and evaporator fans 19, 20 respectively at low speed. Switch 59 completes a circuit through switch 51 to ready compressor motor 8 for energization and to energize resistor 54 in the manner explained above. Pushbutton 63, when depressed, places switches 57, 58, 59 in neutral position.

Temperatures within the control means enclosure 43 are normally between indoor and outdoor temperatures. It is understood that where unit 1 is mounted with the front face thereof substantially flush with the window opening, the temperature within enclosure 43 more nearly approximates outdoor temperature than where unit 1 is mounted so that a larger portion thereof is disposed within the area being conditioned.

Where outdoor temperatures are relatively low, for example, below the exemplary 25° C., it may still be desirable to operate the unit 1 to cool the enclosure. The space 43 within which the temperature sensing control mechanism 50 is located may be at a temperature less than the preset responding temperature for mechanism 50, for example 25° C. In this circumstance, the control means 50 would ordinarily prevent operation of the unit 1 even though the temperatures circumjacent capillary 43 thereof are at or above the exemplary 25° C.

By applicants' arrangement, actuation of either pushbutton control 61 or 62 to close switch 59 to ready unit 1 for operation, completes a circuit to heating element 54. Heating element 54, disposed circumjacent the diaphragm portion 52 of control mechanism 50, heats diaphragm 52 as well as enclosure 43 slightly to permit capillary 53 to exercise control of the unit 1 where outdoor temperature conditions are relatively low.

Other arrangements for heating the area adjacent the diaphragm portion 52 of mechanism 50 may be contemplated such as a small fan which is energized in response to operation of pushbutton control 61 or 62 to draw indoor air into heat exchange relation with thermostatic controlling mechanism 50 or ducting communicating enclosure 43 with the room and the inlet side of evaporator fan 19 so that relatively warm room air to be conditioned is passed through enclosure 43 to the inlet side of fan 19.

While a preferred embodiment of the invention has been described, it will be understood that the invention is not limited thereto since it may be otherwise embodied within the scope of the following claims.

We claim:

1. In an apparatus for air conditioning a space having a cover with compression means, an evaporator and a condenser connected in a closed refrigerant flow circuit therewithin, means partitioning said apparatus cover into an indoor compartment housing said evaporator and an outdoor compartment housing said condenser and compression means, and fan means for circulating air to be conditioned over the evaporator, the combination of control means for said apparatus including switch means adapted when actuated to energize said apparatus to condition said space, and a thermal responsive operator for said switch means comprising an expansible chamber actuator disposed in said outdoor compartment and a temperature responsive element connected thereto, said temperature responsive element protruding into the space being conditioned, said actuator and element forming a closed fluid-filled system effective when exposed to a predetermined temperature to actuate said switch means, and means for heating the portion of said thermal responsive operator exposed to outdoor temperatures to permit said temperature responsive element to control operation of said apparatus when outdoor temperatures are below said predetermined response temperature, said heating means comprising a resistance type heating element circumjacent said expansible chamber actuator, second switch means adapted when actuated to energize said resistance heating element, said second switch means being series connected with said first switch means whereby actuation of said second switch means readies said apparatus for operation under control of said thermal responsive operator.

2. Apparatus according to claim 1 in which said fan means is series connected with said second switch means whereby actuation of said second switch means energizes said fan means.

3. On an appartus for air conditioning a space including a housing with partitioning means separating said housing into an indoor compartment and an outdoor compartment; compression means and a condenser in said outdoor compartment and an evaporator in said indoor compartment, said compression means, condenser and evaporator being connected to form a closed refrigerant flow circuit, and fan means for circulating air to be conditioned over the evaporator, the combination of control means for said apparatus including switch means adapted when actuated to energize said apparatus to condition said space, and a thermal responsive operator for said switch means comprising an expansible chamber actuator in said outdoor compartment and a temperature responsive element connected thereto, said temperature responsive element projecting through said partitioning means into said indoor compartment and the space being conditioned, said actuator and element forming a closed fluid-filled system effective when exposed to a predetermined temperature to actuate said switch means, and means adapted to continuously heat the portion of said thermal responsive operator in said outdoor compartment and exposed to outdoor temperatures during both energization and de-energization of said apparatus to enable said temperature responsive element to initiate and sustain operation of said apparatus when outdoor temperatures are below said predetermined responsive temperature.

References Cited by the Examiner

UNITED STATES PATENTS

| | | | |
|---|---|---|---|
| 2,986,016 | 5/1961 | Gillham | 62—262 X |
| 3,097,503 | 7/1963 | Liebeumann | 62—202 X |
| 3,194,027 | 7/1965 | Prendergast | 62—180 |

MEYER PERLIN, *Primary Examiner.*